US012791441B2

(12) United States Patent
Tabata et al.

(10) Patent No.: US 12,791,441 B2
(45) Date of Patent: Nov. 10, 2026

(54) VEHICLE ELEMENT RESPONSE LEARNING METHOD, VEHICLE ELEMENT RESPONSE CALCULATION METHOD, VEHICLE ELEMENT RESPONSE LEARNING SYSTEM, AND VEHICLE ELEMENT RESPONSE LEARNING PROGRAM

(71) Applicant: HORIBA, LTD., Kyoto (JP)

(72) Inventors: Kunio Tabata, Warwickshire (GB); Philip Roberts, Warwickshire (GB); Luke Bates, Warwickshire (GB); Steven Whelan, Warwickshire (GB)

(73) Assignee: HORIBA, LTD. (JP)

( * ) Notice: Subject to any disclaimer, the term of this patent is extended or adjusted under 35 U.S.C. 154(b) by 318 days.

(21) Appl. No.: 18/293,282

(22) PCT Filed: Jul. 29, 2022

(86) PCT No.: PCT/JP2022/029238
§ 371 (c)(1),
(2) Date: Jan. 29, 2024

(87) PCT Pub. No.: WO2023/008547
PCT Pub. Date: Feb. 2, 2023

(65) Prior Publication Data
US 2025/0093235 A1 Mar. 20, 2025

(30) Foreign Application Priority Data
Jul. 30, 2021 (JP) ................................. 2021-125680
Nov. 9, 2021 (JP) ................................. 2021-182645

(51) Int. Cl.
*G01M 17/007* (2006.01)

(52) U.S. Cl.
CPC ................................ *G01M 17/007* (2013.01)

(58) Field of Classification Search
None
See application file for complete search history.

(56) References Cited

U.S. PATENT DOCUMENTS

2015/0332522 A1* 11/2015 Komada ............ G01M 17/007 701/29.1
2021/0010902 A1 1/2021 Breton
2021/0018016 A1 1/2021 Kim et al.

FOREIGN PATENT DOCUMENTS

CN 109597317 A 4/2019
CN 110414089 A 11/2019
(Continued)

OTHER PUBLICATIONS

English translation of JP 2005-291081 (Year: 2026).*
(Continued)

*Primary Examiner* — Mark A Shabman
(74) *Attorney, Agent, or Firm* — Brooks Kushman P.C.

(57) ABSTRACT

The present invention is to accurately obtain a vehicle element response data under a desired driving environment by simulation without performing actual road driving and is a vehicle element response learning method for generating a trained model related to a response of a vehicle element that is a vehicle or a part of the vehicle, and the method includes: (1) an input step of giving an input including parameters related to a vehicle speed, a load, and a temperature assuming actual road driving, to the vehicle element; (2) an acquisition step of acquiring response data of the vehicle element and acquiring, as training data, input data representing the input and the response data; and (3) a generation step of generating the trained model related to the response of the vehicle element, from the training data by using machine learning.

12 Claims, 11 Drawing Sheets

(56) References Cited

FOREIGN PATENT DOCUMENTS

| | | | | |
|---|---|---|---|---|
| CN | 112078565 | A | | 12/2020 |
| CN | 112395777 | A | | 2/2021 |
| JP | 2000257499 | A | | 9/2000 |
| JP | 2005291081 | A | * | 10/2005 |
| JP | 2019183698 | A | | 10/2019 |
| JP | 2020067762 | A | | 4/2020 |
| JP | 2020177016 | A | | 10/2020 |
| WO | 2019133686 | A1 | | 7/2019 |

OTHER PUBLICATIONS

Taro Shishido and five other persons, et. al, "Dynamic Modelling for Gasoline Direct Injection Engines", keihin technical review, 2017, vol. 6.
Xiao Hang Fang and four other persons, et. al, "Artificial neural network (ANN) assisted prediction of transient NOx emissions from a high-speed direct injection (HSDI) diesel engine", International Journal of Engine Research, Apr. 27, 2021.
International Search Report dated Oct. 25, 2022 issued in International application No. PCT/JP2022/029238.
Partial European Search Report dated Jun. 12, 2025 issued in EP patent application No. 22849607.1.
Office Action dated Mar. 21, 2026 issued in CN patent application No. 202280053174.7.
Office Action dated Sep. 29, 2026 issued in JP patent application No. 2023-538632.

* cited by examiner

VEHICLE ELEMENT RESPONSE LEARNING METHOD, VEHICLE ELEMENT RESPONSE CALCULATION METHOD, VEHICLE ELEMENT RESPONSE LEARNING SYSTEM, AND VEHICLE ELEMENT RESPONSE LEARNING PROGRAM

CROSS-REFERENCE TO RELATED APPLICATIONS

This application is the U.S. national phase of PCT Application No. PCT/JP2022/029238, filed Jul. 29, 2022, which claims priority to Japanese Patent Application No. 2021-182645, filed Nov. 9, 2021, and Japanese Patent Application No. 2021-125680, filed Jul. 30, 2021, the disclosures of which are incorporated in their entirety by reference herein.

TECHNICAL FIELD

The present invention relates to a vehicle element response learning method, a vehicle element response calculation method, a vehicle element response learning system, a vehicle element response learning device, and a vehicle element response learning program.

BACKGROUND ART

In recent years, transient modeling of exhaust gas and the like using the dynamic design of experiments (Dynamic DoE) has been studied (See Non Patent Literatures 1 and 2).

In the transient modeling of exhaust gas or the like, a transient exhaust gas model is generated by machine learning. Then, in order to generate the transient exhaust gas model, training data is acquired using engine control unit (ECU) parameters related to combustion in an engine as input parameters. As the ECU parameters, ignition timing, valve timing for intake and exhaust of the engine, and the like are used, for example.

CITATION LIST

Non Patent Literature

Non Patent Literature 1: Taro SHISHIDO and five others, "Dynamic Modelling for Gasoline Direct Injection Engines", Keihin Technical Review Vol. 6 (2017)

Non Patent Literature 2: Xiao Hang Fang and four others, "Artificial neural network (ANN) assisted prediction of transient NOx emissions from a high-speed direct injection (HSDI) diesel engine", International Journal of Engine Research (Apr. 27, 2021)

SUMMARY OF INVENTION

Technical Problem

However, Non Patent Literatures 1 and 2 disclose a method for generating a transient exhaust gas model, but do not disclose at all how to generate the transient exhaust gas model in consideration of a driving environment in actual road driving. In addition, in order to use such transient exhaust gas model for real-road exhaust gas prediction, it is necessary to associate the transient exhaust gas model with other input parameters (vehicle speed, accelerator opening degree, altitude, outside air temperature, and the like) in accordance with a real-road environment, and effort is further required to improve the prediction accuracy in actual road driving simulation.

In addition, in order to generate a transient exhaust gas model in Non Patent Literatures 1 and 2, it is necessary to set ECU parameters related to combustion in an engine. Here, examples of the ECU parameters include ignition timing in the engine or valve timings for intake and exhaust of the engine. Only a limited number of engineers of an original equipment manufacturer (OEM), a Tier 1 (primary subcontractor) supplier, and the like can access these parameters, and in order to grasp in advance how a change in these parameters affects the engine, it is necessary to perform repetitive confirmation tests and perform multivariate analysis on an enormous amount of data. Furthermore, if there is an error in a set value, a combination, or a timing with respect to a parameter to be changed, it may cause a damage to the engine. As described above, the transient exhaust gas model using the Dynamic DoE is actually generated only by limited engineers who can access a control device such as an ECU.

Therefore, the present invention has been made to solve the above problems, and a main object of the invention is to accurately obtain response data of a vehicle element under a desired driving environment by simulation without performing actual road driving.

Solution to Problem

That is, a vehicle element response learning method according to the present invention is for generating a trained model related to a response of a vehicle element that is a vehicle or a part of the vehicle, and the method includes: an input step of giving an input including parameters related to a vehicle speed, a load, and a temperature assuming actual road driving, to the vehicle element; an acquisition step of acquiring response data of the vehicle element and acquiring, as training data, input data representing the input and the response data; and a generation step of generating the trained model related to the response of the vehicle element, from the training data by using machine learning.

Such a configuration enables the following operation. An input including parameters related to a vehicle speed, a load, and a temperature assuming actual road driving is given to a vehicle element, the thus obtained response data is acquired, and a trained model regarding the response of the vehicle element is generated from a training data including input data representing the input given to the vehicle element and the response data, by using machine learning (including a statistical method). As a result, by using the trained model, it is possible to acquire model input data of a vehicle element under a desired driving environment and response data output from the trained model, by simulation without performing actual road driving. In addition, since control parameters such as ECU parameters related to combustion in the engine is not changed, it is possible to easily and safely generate a response model without repeated tests for generating an optimal experimental plan, analysis of enormous amount of data as results of the repeated tests, or the like.

In order to more precisely reproduce the driving environment of actual road driving, it is effective to take into account a change in an atmospheric pressure in addition to a change in temperature. Therefore, in order to accurately obtain the response data of the vehicle element under a desired environment by simulation, it is preferable that, in the input step, the vehicle element be given an input including a parameter related to an atmospheric pressure assuming actual road driving in addition to the vehicle speed, the load, and the temperature.

A specific embodiment is preferably configured as follows. In the input step, each of the parameters is varied in a variation range of each of the vehicle speed, the load, the temperature, and the atmospheric pressure, and an input that is a combination of the varied parameters is given to the vehicle element.

There is a case where a single temperature variation facility or a single atmospheric pressure variation facility cannot change the environmental factors (temperature and atmospheric pressure) in a change time desired to be predicted or in a movement time desired to be predicted over the entire variation ranges of the environmental factors. Furthermore, depending on the content of the simulation of a user, only a part of the variation ranges of the environmental factors (temperature and atmospheric pressure) is sometimes sufficient. Therefore, the following operation is preferable. In the input step, the variation ranges of the temperature and the atmospheric pressure are divided into a plurality of blocks, and a divided input obtained by dynamically varying the temperature and the atmospheric pressure in the divided blocks are given to the vehicle element; and in the acquisition step, response data of the vehicle element to which the divided input is given is acquired, and divided input data representing the divided input and the response data are acquired as divided training data.

In order to generate continuous data between the divided blocks, it is preferable that, in the input step, an input in which the temperature and the atmospheric pressure are dynamically varied at a boundary between the divided blocks be given to the vehicle element.

In order to change the temperature and the atmospheric pressure in the input step, it is preferable that the temperature and the atmospheric pressure be varied by an environment variation device that is connected to the vehicle element to vary a temperature and a pressure, or an environment variation chamber that the vehicle element is accommodated in and that varies a temperature and a pressure.

In order to efficiently obtain the training data, it is preferable that in the input step, a dynamic experimental plan including a combination of the parameters be generated using the design of experiments (DoE).

As a specific embodiment of the response data, the followings are preferable. When the vehicle element is a vehicle including at least an engine or a part of the vehicle, the response data is exhaust gas data; when the vehicle element is a vehicle including at least a secondary battery or a part of the vehicle, the response data is electricity mileage data, current data, voltage data, state of charge (SOC) data, and/or battery temperature data (for example, cell temperature data or module temperature data); and when the vehicle element is a vehicle including at least a fuel battery or a part of the vehicle, the response data is hydrogen consumption amount data, oxygen consumption amount data, generated current data, generated voltage data, and/or battery temperature data.

As a specific embodiment, the followings can be considered. The exhaust gas data is measured using an exhaust gas analyzer; the electricity mileage data, the current data, the voltage data, the SOC data, or the temperature data is measured using a power consumption meter, an ammeter, a voltmeter, or a thermometer; and the hydrogen consumption amount data, the oxygen consumption amount data, the generated current data, the generated voltage data, or the battery temperature data is measured using a hydrogen meter, an oxygen meter, an ammeter, a voltmeter, or a thermometer.

As a specific embodiment, the followings can be considered. When the vehicle element is a vehicle including at least a secondary battery or a part the vehicle, the parameter related to the vehicle speed or the load is a charging current and/or a discharging current, and the parameter related to the temperature is an ambient temperature of the secondary battery; and when the vehicle element is a vehicle including at least a fuel battery or a part of the vehicle, the parameter related to the vehicle speed or the load is a hydrogen supply amount, an oxygen supply amount, and/or a water supply amount, and the parameter related to the temperature is an ambient temperature of the fuel battery.

In addition, a vehicle element response calculation method according to the present invention includes calculating the response data of the vehicle element in actual road driving by using the trained model generated by the vehicle element response learning method. Specifically, in the vehicle element response calculation method, the response data of the vehicle element in actual road driving is calculated by using the trained model and using output parameters (vehicle speed, load, temperature, or pressure) generated from a model (for example, IPG CarMaker) with which an actual road driving simulation can be performed.

By such a method, it is possible to acquire response data of a vehicle element under a desired driving environment by simulation without performing actual road driving.

A vehicle element response learning system according to the present invention generates a trained model related to a response of a vehicle element that is a vehicle or a part of the vehicle, and the system includes: an input unit that gives an input including parameters related to a vehicle speed, a load, and a temperature assuming actual road driving, to the vehicle element; an acquisition unit that acquires response data of the vehicle element and acquires, as training data, input data representing the input and the response data; and a generation unit that generates the trained model related to the response of the vehicle element, from the training data by using machine learning.

Specifically, the input unit preferably configured as follows. The input unit includes: a dynamometer that applies a load to the vehicle element; and a test chamber in which the vehicle element is accommodated. The input unit further includes: an environment variation device that varies at least temperature in the test chamber; or an environment variation device that is connected to the vehicle element and varies at least temperature.

In addition, a vehicle element response learning program according to the present invention generates a trained model related to a response of a vehicle element that is a vehicle or a part of the vehicle, and causes a computer to execute the following functions: a function of an input data generation unit that generates input data that is to be given to the vehicle element and includes parameters related to a vehicle speed, a load, and a temperature assuming actual road driving; a function of an acquisition unit that acquires response data of the vehicle element and acquires, as training data, the input data and the response data; and a generation unit that generates the trained model related to the response of the vehicle element, from the training data by using a statistical method or machine learning.

Advantageous Effects of Invention

With the present invention described above, it is possible to accurately obtain response data of a vehicle element under a desired driving environment by simulation without performing actual road driving.

DESCRIPTION OF EMBODIMENTS

Hereinafter, a vehicle element response learning system according to an embodiment of the present invention will be described with reference to the drawings.

Device Configuration of Vehicle Element Response Learning System 100

A vehicle element response learning system 100 of the present embodiment generates a trained model related to a response of a vehicle element that is a real vehicle or a part of the real vehicle. This trained model is used to calculate, by simulation, exhaust gas data or electricity mileage data of a vehicle element at the time of an on-road driving test conforming to laws and regulations, for example. Here, the on-road driving test conforming to lows and regulations is, for example, a real driving emission (RDE) test introduced in countries in Europe or the like. In addition, the generated trained model can also be used for calculation of exhaust gas data or electricity mileage data of the vehicle element in the on-road driving test on a development stage of the vehicle element, in addition to the on-road driving test conforming to laws and regulations.

Figure 1:
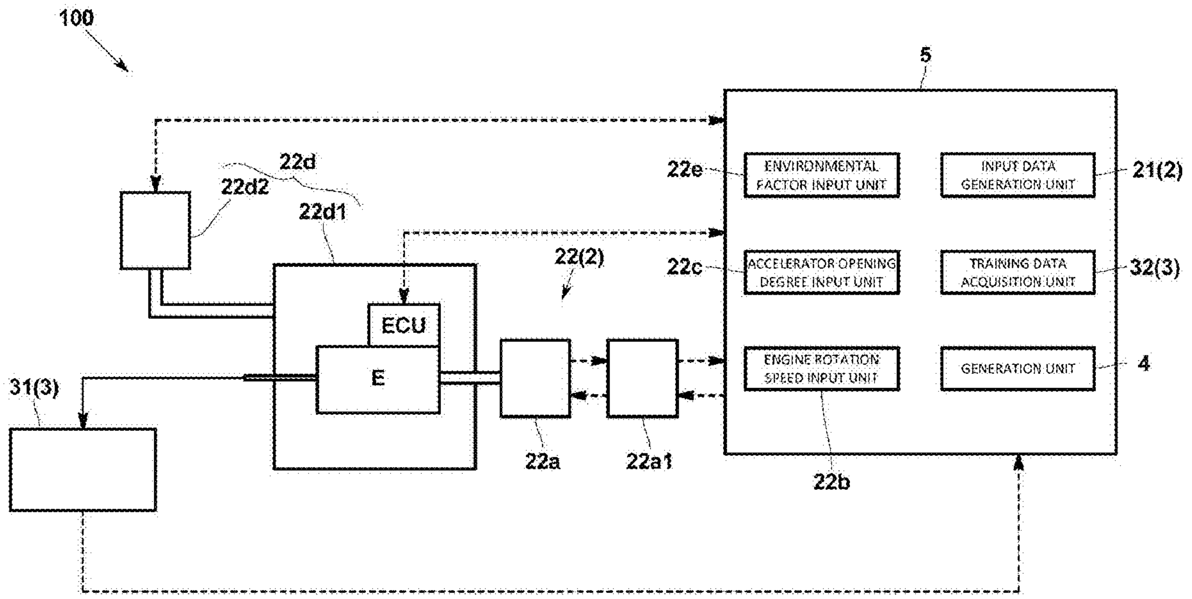
FIG. 1 is a diagram schematically illustrating a configuration of a vehicle element response learning system of an embodiment of the present invention.

Specifically, as illustrated in FIG. 1, the vehicle element response learning system 100 includes the following (1) input unit 2, (2) acquisition unit 3, and (3) generation unit 4. Hereinafter, the vehicle element is a real engine, and the response data is exhaust gas data from the real engine.

(1) The input unit 2 that gives, as a vehicle speed assuming actual road driving, an input including parameters related to engine rotation speed, load, temperature, and atmospheric pressure, to the real engine.

(2) The acquisition unit 3 that acquires exhaust gas data of the real engine and acquires, as training data, input data representing the input and the exhaust gas data.

(3) The generation unit 4 that generates, from the training data, a trained model (exhaust gas model) related to the exhaust gas of the real engine by using machine learning (including a statistical method).

Input Unit 2

The input unit 2 gives an input including a combination of an engine rotation speed, a load, a temperature, and an atmospheric pressure to the real engine E that is the vehicle element, and includes: an input data generation unit 21 that generates input data representing an input that is a combination of the parameters; and an input equipment 22 that gives an input to the real engine E on the basis of the combination of the parameters determined by the input data generation unit 21.

The input data generation unit 21 is configured with a control device 5, and here, determines a combination (experimental plan) of the parameters for acquiring training data that is required at the time of a generation step, by using the dynamic design of experiments (DoE). Note that, the control device 5 is a computer including a central processing unit (CPU), an internal memory, an input/output interface, an input means such as a keyboard, an output means such as a display, a communication means, and the like. Then, the control device 5 is caused to function as a vehicle element response learning device by a vehicle element response learning program stored in the internal memory.

Specifically, the input data generation unit 21 determines a combination of the parameters while dynamically changing each parameter in a variation range of each of the engine rotation speed, the load, the temperature, and the atmospheric pressure, using the dynamic design of experiments (DoE). Instead of the engine rotation speed, the vehicle speed or the rotation speed of the output shaft of the transmission may be used as a parameter. The load is an accelerator opening degree (accelerator pedal position) or the like. Furthermore, the input data generation unit 21 may use environmental factors other than temperature and atmospheric pressure as parameters.

Figure 2A:
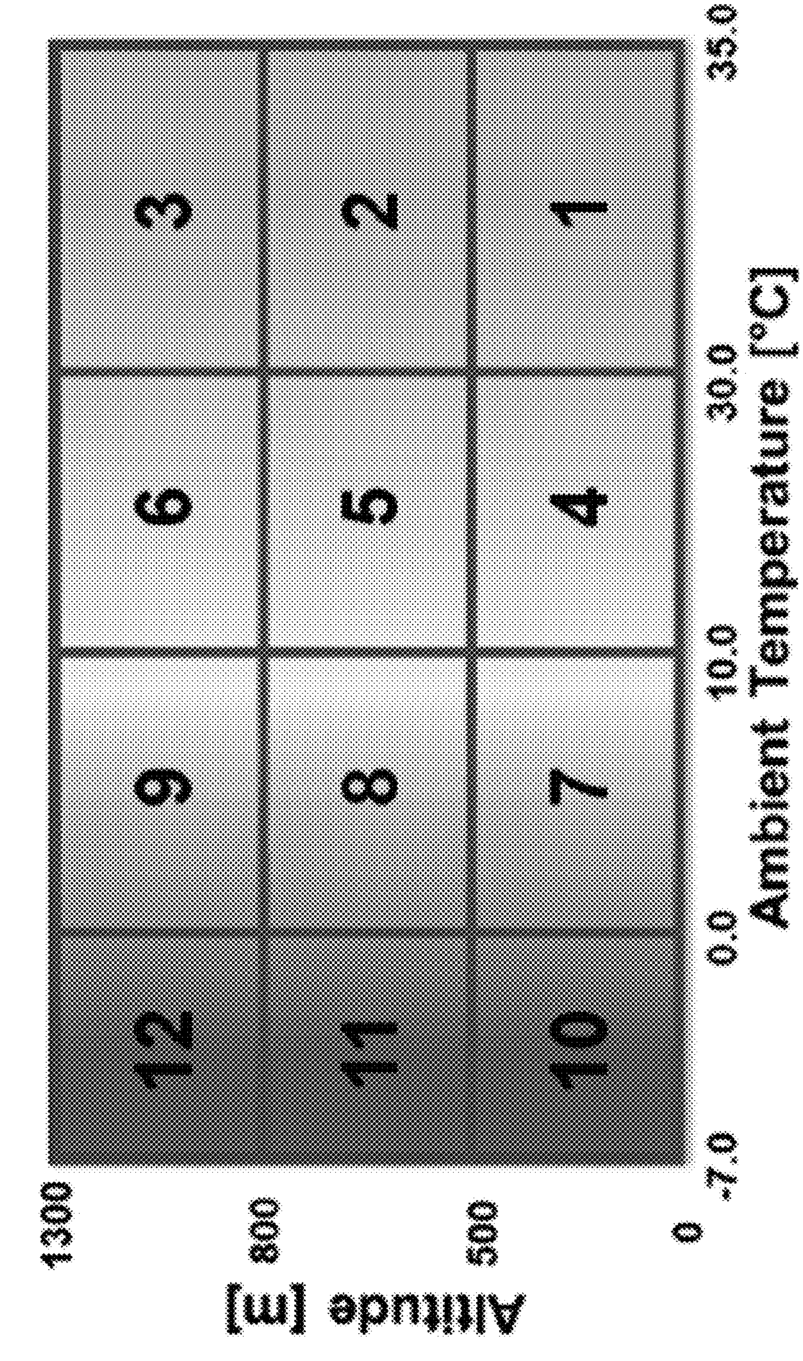
FIGS. 2A and 2B are diagrams that illustrate, respectively, blocks of a temperature and an atmospheric pressure (altitude) of the embodiment and a combination of a vehicle speed (engine rotation speed) and a load (accelerator pedal position).
Figure 2B:
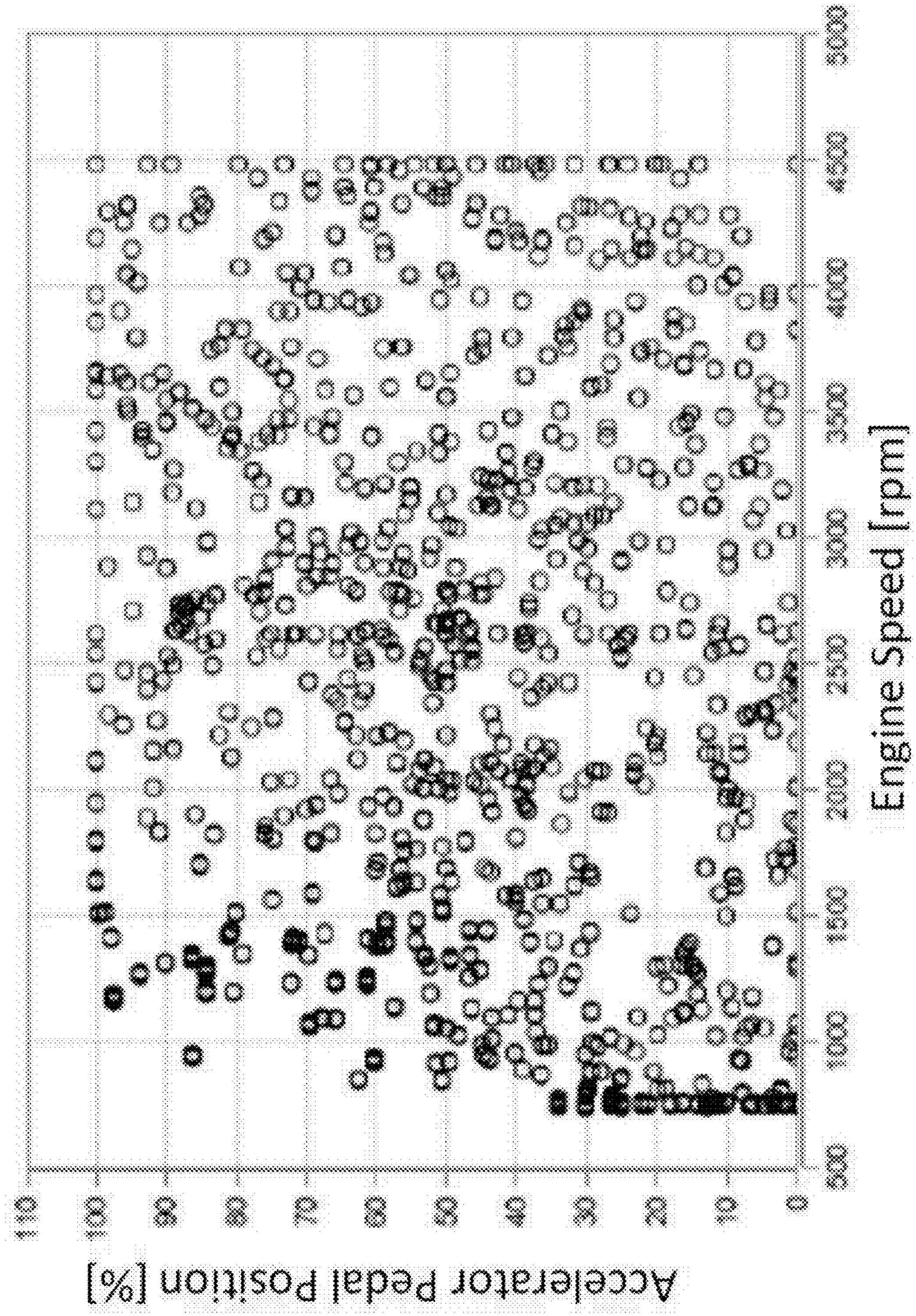

As illustrated in FIG. 2A, the input data generation unit 21 of the present embodiment divides the variation ranges of the temperature and the atmospheric pressure into a plurality of blocks, and determines a combination in which the temperature and the atmospheric pressure are dynamically changed, in each of the plurality of divided blocks. FIG. 2A illustrates an example in which the variation ranges of the temperature and the atmospheric pressure are divided into 12 blocks. In FIG. 2A, the horizontal axis represents temperature, and the vertical axis represents altitude (atmospheric pressure). Furthermore, FIG. 2B illustrates combinations of the engine speed (engine rotation speed) and the accelerator pedal position. In FIG. 2B, the horizontal axis represents engine speed (engine rotation speed), and the vertical axis represents accelerator pedal position.

Then, for each divided block in FIG. 2A, the input data generation unit 21 adds the combination, in which the temperature and the atmospheric pressure are dynamically changed, to the combinations of the engine speed (engine rotation speed) and the accelerator pedal position in FIG. 2B, thereby determining a divided input to be given to the real engine E.

The input equipment 22 includes: a dynamometer 22*a* connected to the real engine E; an engine rotation speed input unit 22*b* that inputs engine rotation speed data to a dynamometer control device 22*a*1 of the dynamometer 22*a*; an accelerator opening degree input unit 22*c* that inputs accelerator opening degree data to an engine control unit (ECU) for the real engine E; an environment variation device 22*d* that varies temperature and pressure of a test chamber 22*d*1 in which the real engine E is accommodated; and an environmental factor input unit 22*e* that inputs temperature data and atmospheric pressure data to the environment variation device 22*d*. As the input equipment 22, an environment variation device may be used that is connected to the real engine E and changes the temperature and pressure in the real engine E.

The engine dynamometer 22*a* rotates the real engine E at a predetermined engine rotation speed based on the engine rotation speed data input by the engine rotation speed input unit 22*b*.

The function of the engine rotation speed input unit 22*b* is executed by the dynamometer control device, and the engine rotation speed data included in the combination determined by the input data generation unit 21 is input to the engine dynamometer 22*a*.

The function of the accelerator opening degree input unit 22*c* is executed by the control device 5, and the accelerator opening degree input unit 22*c* inputs load data (accelerator opening degree data) included in the combination determined by the input data generation unit 21, to the ECU for the real engine E.

The environment variation device 22*d* includes: the test chamber 22*d*1 in which the real engine E is accommodated; and a temperature and pressure variation device 22*d*2 that is connected to the real engine E accommodated in the test chamber 22*d*1 and changes the temperature and the pressure of the real engine E. Then, the temperature and pressure variation device 22*d*2 varies the temperature and the atmospheric pressure in the test chamber 22*d*1 on the basis of the temperature data and the atmospheric pressure data input from the environmental factor input unit 22*e*.

The function of the environmental factor input unit 22*e* is executed by the control device 5, and the environmental factor input unit 22*e* inputs the temperature data and the atmospheric pressure data included in the combination determined by the input data generation unit 21, to the temperature and pressure variation device 22*d*2.

In the present embodiment, the input data generation unit 21 divides the variation ranges of the temperature and the atmospheric pressure into a plurality of blocks, and determines combinations (divided inputs) in which the temperature and the atmospheric pressure are dynamically varied in the divided blocks, and the above-described input equipment 22 gives an input to the real engine E for each divided input.

Acquisition Unit 3

The acquisition unit 3 includes: an exhaust gas analyzer 31 that acquires the exhaust gas data of the real engine E input by the input equipment 22 described above; and a training data acquisition unit 32 that acquires, as training data (learning data set), input data representing the input given to the real engine E and exhaust gas data obtained by the exhaust gas analyzer 31.

The exhaust gas analyzer 31 analyzes at least one of carbon dioxide ($CO_2$), carbon monoxide (CO), particulate matter (PM), the number of particulate matters (PN), ammonia ($NH_3$), dinitrogen monoxide ($N_2O$), nitrogen oxide (NOx), formaldehyde (HCHO), and/or total hydrocarbon (THC) in the exhaust gas discharged from the real engine E. The exhaust gas data measured by the exhaust gas analyzer 31 is transmitted to the training data acquisition unit 32.

The training data acquisition unit 32, whose function is executed by the control device 5, acquires the exhaust gas data transmitted from the exhaust gas analyzer 31 and acquires the input data representing the input given to the real engine E when having acquired the exhaust gas data. Then, the training data acquisition unit 32 associates the exhaust gas data and the input data with each other to form the training data. The training data acquisition unit 32 further transmits the training data to the generation unit 4.

In the present embodiment, the input data generation unit 21 divides the variation ranges of the temperature and the atmospheric pressure into a plurality of blocks, and determines combinations (divided inputs) in which the temperature and the atmospheric pressure are dynamically varied in the divided blocks, and the training data acquisition unit 32 also acquires the training data (divided training data) for each divided block.

Generation Unit 4

The function of the generation unit 4 is executed by the control device 5, and the generation unit 4 generates the trained model (exhaust gas model) related to the exhaust gas of the real engine from the training data (here, divided training data) by using machine learning such as a neural network (NN). Note that the machine learning of the present embodiment is a concept including, for example, a statistical method (such as multiple regression analysis), deep learning, and artificial intelligence.

The generation unit 4 of the present embodiment can generate a trained model (exhaust gas model) for each of divided block by using the training data for each divided block, or can generate a trained model (exhaust gas model) for the entire temperature and atmospheric pressure variation ranges by combining the training data for each divided block.

Vehicle Element Response Learning Method

Next, a vehicle element response learning method using the vehicle element response learning system 100 will be described.

Figure 3:
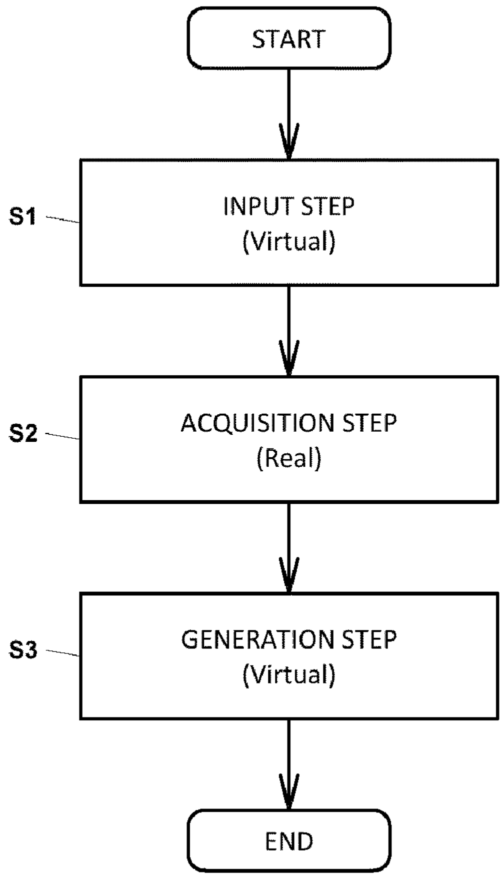
FIG. 3 is a flowchart of a vehicle element response learning method of the embodiment.

As illustrated in FIG. 3, the vehicle element response learning method includes: an input step S1 of giving the real engine E an input whose parameters are vehicle speed, load, temperature, and atmospheric pressure assuming actual road driving; an acquisition step S2 of acquiring the exhaust gas data of the real engine E and acquiring, as the training data, the input data representing the input and the exhaust gas data; and a generation step S3 of generating the trained model (exhaust gas model) related to the exhaust gas of the real engine E from the training data by using machine learning.

Figure 4:
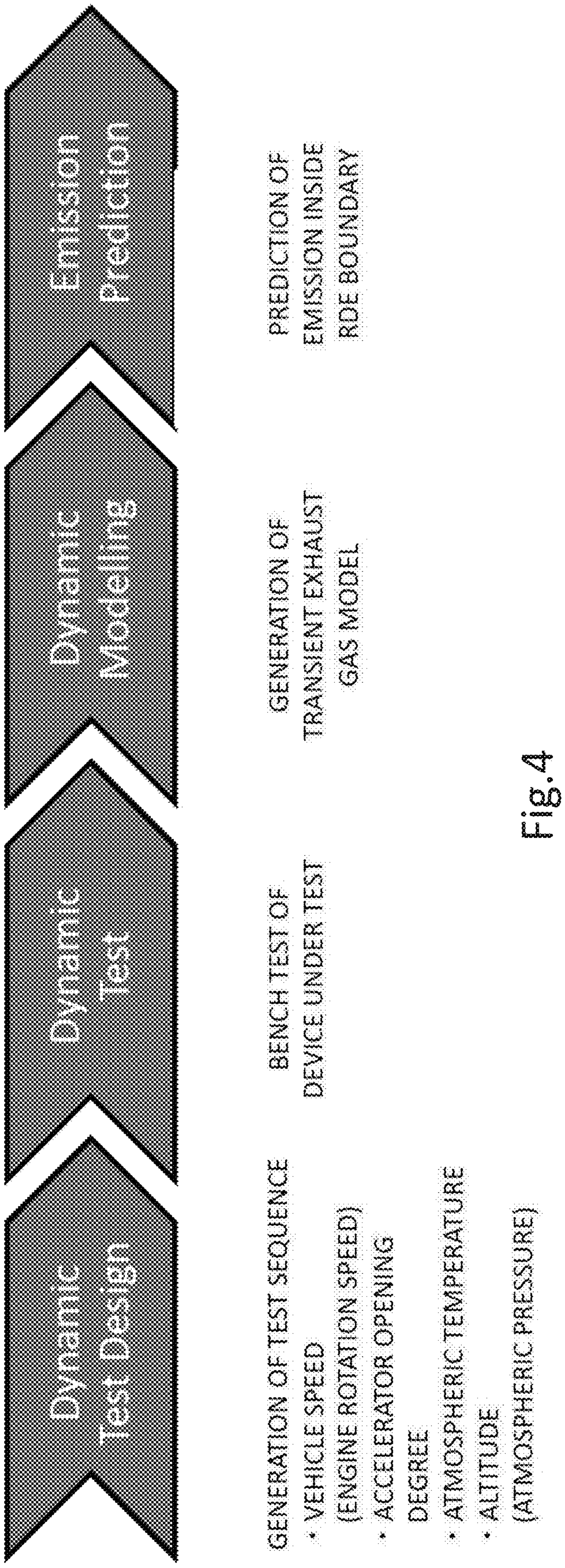
FIG. 4 is a schematic diagram illustrating a flow up to generation and simulation of an exhaust gas model of the embodiment.

In the input step S1, as described above, with respect to each of the blocks obtained by dividing the variation ranges of temperature and atmospheric pressure into a plurality of ranges, the divided input in which temperature and atmospheric pressure are dynamically varied is determined by the input data generation unit 21 by using the dynamic design of experiments (DoE). Note that "Dynamic Test Design" in FIG. 4 illustrates an example of a transient test sequence generated by the input data generation unit 21. Then, the divided input determined by the input data generation unit 21 is input to the real engine by the input equipment 22 (see "Dynamic Test" in FIG. 4).

In the acquisition step S2, the exhaust gas data of the real engine E is acquired every time each combination is input to the real engine E. Then, the training data acquisition unit 32 acquires, as the divided training data, the exhaust gas data together with the input data at the time of acquiring the exhaust gas data.

In the generation step S3, the exhaust gas model of the real engine E is generated from the training data or the divided training data by using machine learning. An example of exhaust gas modeling is illustrated in "Dynamic Modelling" in FIG. 4. The generated trained model (exhaust gas model) is stored in the memory of the control device 5.

Simulation Using Trained Model (Exhaust Gas Model)

Figure 5:
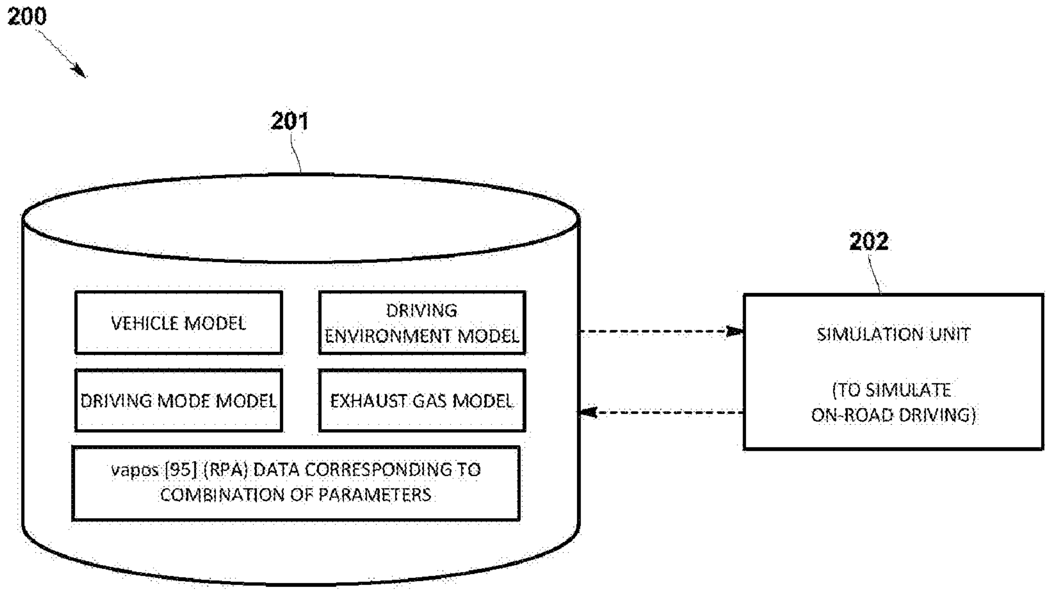
FIG. 5 is a diagram schematically illustrating a configuration of a simulation device according to the embodiment.

Next, with reference to FIG. 5, a description will be given on a simulation device 200 (information processing device) that simulates the exhaust gas data of the real engine E in the on-road driving test by using the generated trained model (exhaust gas model).

The simulation device 200 simulates an on-road driving test by using the following models: a driving environment model that models a driving environment; a driving mode model that models a driving mode; a vehicle model that models a real vehicle; and a generated trained model (exhaust gas model), and is a computer including a CPU, an internal memory, an input/output interface, an input means such as a keyboard, an output means such as a display, a communication means, and the like.

The simulation device 200 includes: a related data storage unit 201 that stores the models; and a simulation unit 202 that simulates driving based on the RDE test.

The driving environment model stored in the related data storage unit 201 is a model in which the followings are quantified: a driving route; a road surface friction of a driving route; a sign; temperature and humidity; an altitude of a driving route; a degree of traffic jam (traffic volume) of a driving route; and the like.

In addition, the driving mode model stored in the related data storage unit 201 is a model in which Dynamics (work), Energy Efficiency (energy efficiency), and Nervousness (degree of tension) are quantified in a case of using, for example, software "CarMaker" of IPG Automotive is used.

Specifically, the driving mode model includes the following parameters listed in, for example, "CarMaker".

Parameters of Dynamics: Crusing speed[km/h], Corner cutting coefficient[-], dt Change of pedals[s], Max. Long Acceleration[$m/s^2$], Max. Long Deceleration[$m/s^2$], Max. Lat Acceleration[$m/s^2$], Exponent of g-g Diagram[-], Time of Shifting[s], Engine Speeds min/mas[rpm], Engine Speeds idle up/acc. Down[rpm], Long Smooth Throttle Limit[-]

Parameters of Energy Efficiency: Min. dt Accel/Decel[s], Long Drag Torque Braking[-], Long Drive Cycle Tol[-], Long drive Cycle Coef[-]

Parameters of Nervousness: Long SDV Random[-], Long SDV Random f[-]

Furthermore, the vehicle model stored in the related data storage unit 201 has an engine model in which at least an engine is quantified, and is a model that models the following vehicle information: a type of a real vehicle (such as truck or passenger vehicle), a weight, a transmission type (such as manual transmission (MT), automatic transmission (AT), or continuously variable transmission (CVT)), a tire diameter, transmission gear ratios, engine characteristics (such as the relationship of an output torque with respect to a throttle opening degree and a rotation speed), control characteristics of an ECU (such as the relationship between an accelerator opening degree and a throttle opening degree), control characteristics of a transmission control unit (TCU) (such as a condition for changing a transmission gear ratio and the timing for the changing)), or control characteristics of a brake control unit (BCU) (such as distribution of a braking force to wheels). Each of these models is stored in the related data storage unit 201 in advance.

The simulation unit 202 simulates, based on the models stored in the related data storage unit 201, driving whose emission test result by the moving averaging window (MAW) method or the Power Bining method as an on-road driving test based on, for example, the RDE test falls within a predetermined range.

Figure 6:
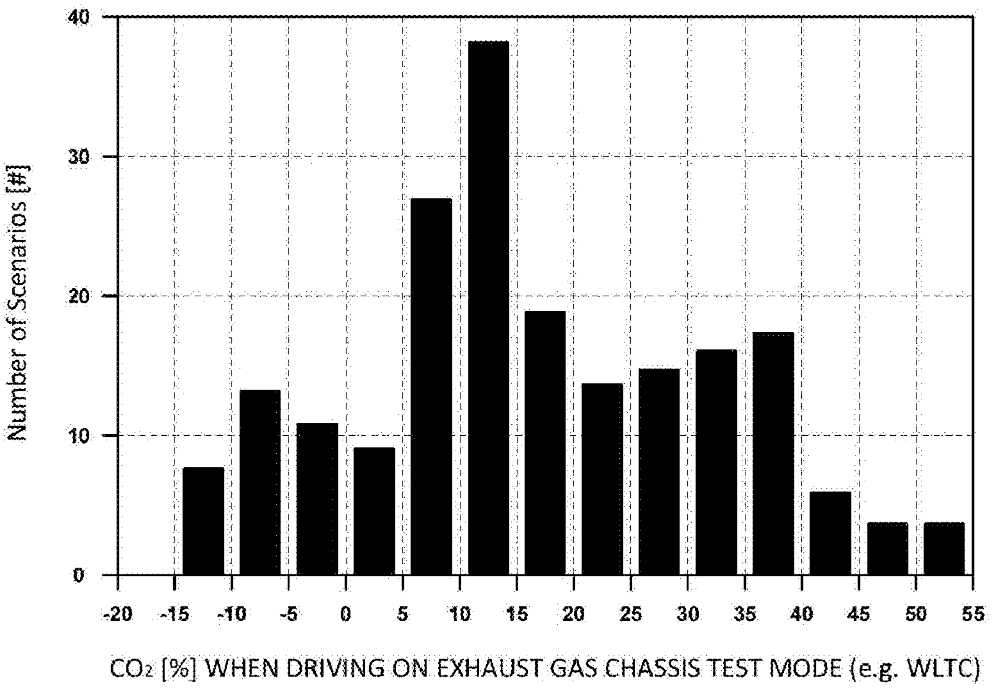
FIG. 6 is a simulation result of a $CO_2$ emission amount in actual driving obtained using the exhaust gas model of the embodiment.

In addition, the simulation unit 202 simulates an emission amount of each exhaust gas component contained in the exhaust gas emitted when the vehicle performs the above driving, on the basis of the trained model (exhaust gas model) stored in the related data storage unit 201. The exhaust gas model may be stored in the simulation unit 202. Note that "Emission Prediction" in FIG. 4 illustrates an example of a simulation result of the emission amount. Here, when simulating, in the simulation unit 202, the emission amount of each exhaust gas component, the emission amounts of the exhaust gas components may be simulated all at once using the models (including the exhaust gas model) stored in the related data storage unit 201, or alternatively, the on-road driving test may be simulated using the models (excluding the exhaust gas model) stored in the related data storage unit 201, and the emission amount of each exhaust gas component may be simulated on the basis of various parameters obtained by such simulation and the exhaust gas model. For example, a use case and the worst case can be specified by simulating various types of actual driving by the simulation device 200 as illustrated in FIG. 6 and thereby estimating the $CO_2$ emission amount in the actual driving.

Effects of Present Embodiment

With the vehicle element response learning system 100 of the present embodiment, a trained model related to exhaust gas of a real engine E can be generated by the following procedure: input whose parameters are a vehicle speed, a load, a temperature, and an atmospheric pressure assuming actual road driving is given to the real engine E; exhaust gas data thus obtained is acquired; and the trained model related to the exhaust gas of the real engine E is generated from training data constituted by input data representing the input given to the real engine E and the exhaust gas data, by using machine learning. As a result, by using the trained model, it is possible to acquire the response data of the vehicle element under a desired driving environment by simulation without performing actual road driving. In addition, since the control parameter such as the ECU parameter related to the combustion in the engine is not changed, the response model can be easily and safely generated using an already adapted ECU map.

Other Modified Embodiments

Note that the present invention is not limited to the above embodiment.

For example, although the vehicle element of the above embodiment is a real engine, the vehicle element only needs to be a part of a real vehicle including the real engine. In order to generate the trained model related to the response of a real vehicle, it is considered to use a chassis dynamometer, a vehicle drive system testing apparatus, or the like.

In the input step of the above embodiment, an input in which the temperature and the atmospheric pressure are dynamically changed at a boundary between the divided blocks may be given to the vehicle element.

The response data of the above embodiment is the exhaust gas data, but other than that, the response data may be temperature data of an exhaust gas purification catalyst, exhaust gas temperature data, flow rate data, or pressure data.

Figure 7:
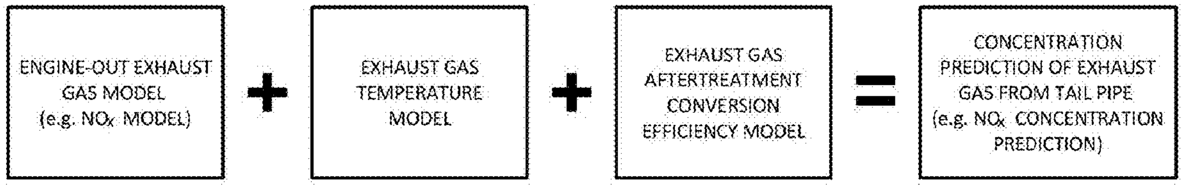
FIG. 7 is a diagram illustrating an example of concentration prediction of exhaust gas of a modified embodiment.

For example, as illustrated in FIG. 7, the vehicle element response learning system 100 generates an engine-out exhaust gas model using the exhaust gas data as the response data, and generates an exhaust gas temperature model or a catalyst temperature model using the exhaust gas temperature data or the temperature data of the exhaust gas purification catalyst as the response data. Then, the simulation device 200 can also predict exhaust gas data discharged from the tail pipe (exhaust pipe) by using the engine-out exhaust gas model, the exhaust gas temperature model or the catalyst temperature model, and a conversion efficiency model of exhaust gas aftertreatment. The above conversion efficiency model models, for example, the conversion efficiency with respect to the temperature of the exhaust gas purification catalyst.

For example, at the time of generating the exhaust gas model, the vehicle element response learning system 100 gives input data including parameters related to the vehicle speed, the load, and/or the temperature to the vehicle element, and outputs the exhaust gas data (for example, exhaust gas concentrations, exhaust gas flow rates, and/or emission amounts of exhaust gases of NOx, CO, $CO_2$, THC, and/or $NH_3$) as the response data. Then, the input data and the response data are machine-learned to acquire trained data of the exhaust gas model (for example, models of NOx, CO, $CO_2$, THC and/or $NH_3$).

Furthermore, at the time of generating the exhaust gas temperature model, the vehicle element response learning system 100 gives input data including parameters related to the vehicle speed, the load, the temperature, and/or the exhaust gas data to the vehicle element, and acquires the exhaust gas temperature and/or the exhaust gas catalyst temperature as the response data. Then, the vehicle element response learning system 100 machine leans the input data and the response data to generate a trained model of the exhaust gas temperature model. In addition, when generating the exhaust gas aftertreatment conversion efficiency model, the vehicle element response learning system 100 gives input data including the exhaust gas data and the parameters related to the exhaust gas temperature and/or the exhaust gas catalyst temperature to the vehicle element, and acquires the exhaust gas data as the response data. Then, the vehicle element response learning system 100 machine learns the input data and the response data to generate a trained model of the exhaust gas aftertreatment conversion efficiency model.

Furthermore, the vehicle element of the above embodiment may be a hybrid vehicle or a part of the hybrid vehicle in which an engine and a battery operate in cooperation. The present invention is not limited to an engine vehicle or a hybrid vehicle, and can also be applied to an electric vehicle (EV) or a fuel cell vehicle (FCV).

In a case where the vehicle element includes a real battery (secondary battery) mounted on the vehicle, the response data acquired by the acquisition unit 3 is electricity mileage data, current data, voltage data, state of charge (SOC) data, or battery temperature data. Here, the electricity mileage data or the SOC data can be measured using a power consumption meter. The current data or the voltage data can be measured using an ammeter or a voltmeter, respectively. The battery temperature data is the temperature data of cells constituting the real battery or the temperature data of a module or a battery pack including a plurality of cells, and can be measured using a thermometer. Other than that, the SOH (state of health) data may be used as the response data of the real battery. In addition, as those types of data, it is possible to use values that can be acquired from a system (electric control system (ECU), battery management system (BMS), and/or vehicle control system (VU)) mounted on the vehicle.

Figure 8:
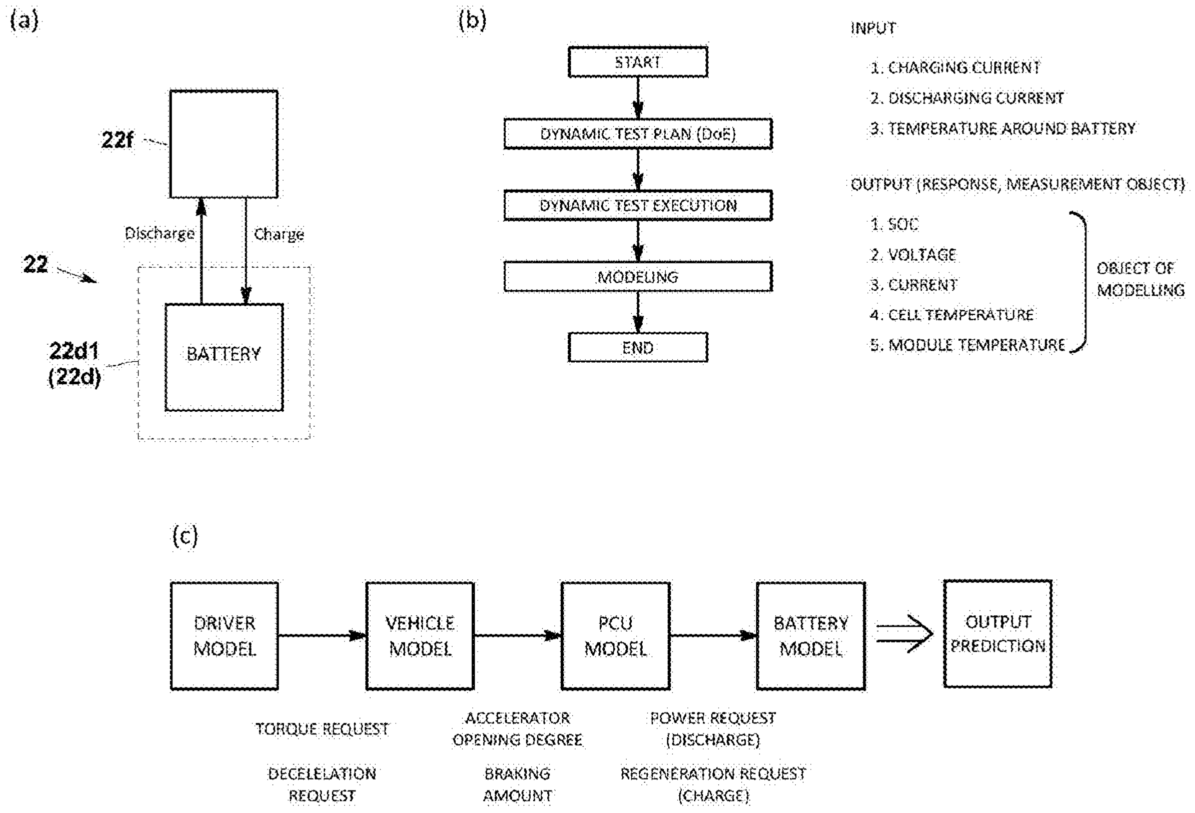
FIG. 8 is schematic diagrams of (a) a diagram illustrating a test system that generates a trained model related to a response of a real battery (secondary battery) in a modified embodiment, (b) a flowchart of generation of a battery model, and (c) a schematic diagram of a simulation using the battery model.

FIG. 8(*a*) illustrates a test system that generates a trained model related to a response of a real battery (secondary battery). FIG. 8(*b*) illustrates a flowchart of generation of a battery model. FIG. 8(*c*) illustrates a schematic diagram of a simulation using the battery model.

As illustrated in FIG. 8(*a*), the test system that generates the battery model includes, as the input equipment 22, a charge and discharge device **22*f* that charges or discharges the real battery (real battery pack, real battery module, or real battery cells) accommodated, for example, in the test chamber 22*d*1 of the environment variation device 22*d*. Then, the test system generates the battery model by charging or discharging the real battery by the charge and discharge device 22*f***.

Specifically, as illustrated in FIG. 8(*b*), the input data generation unit 21 of the input unit 2 determines a combination of the parameters by using the dynamic design of experiments (DoE) ("dynamic test plan"), similarly to the above embodiment. Here, respective ones of parameters are parameters related to a vehicle speed, a load, and a temperature assuming actual road driving, the parameter related to the vehicle speed and the load is, for example, a charging current or a discharging current, and the parameter related to the temperature is, for example, a temperature around the battery.

Then, an input including a combination of the determined parameters is given to the real battery (real battery pack, real battery module, or real battery cells) by the charge and discharge device **22*f* and the environment variation device 22*d*. Here, the training data acquisition unit 32 of the acquisition unit 3** acquires, as training data (learning data set), the input data representing the input given to the real battery and the response data of the real battery ("dynamic test execution"). Here, as the response data of the real battery, it is possible to consider, for example, the SOC data, the current data, the voltage data, the cell temperature data, and/or the module temperature data.

Next, the generation unit 4 generates the battery model of the real battery by using the training data obtained by the "dynamic test execution" ("modeling"). The battery model thus obtained is used for simulation of an on-road driving test by the simulation device 200.

Figure 9:
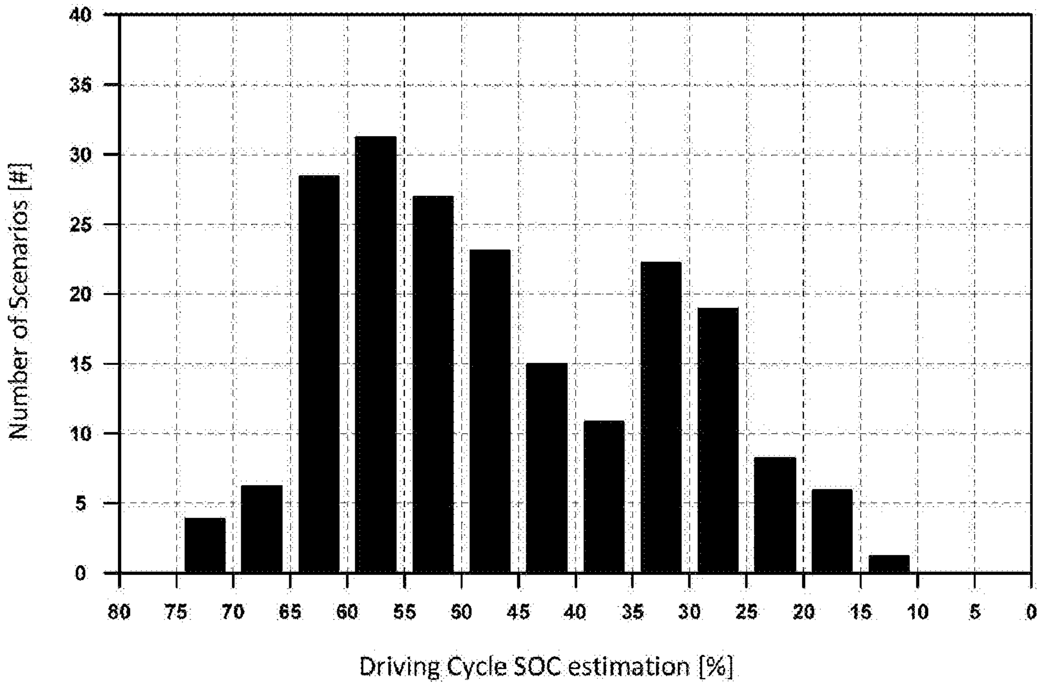
FIG. 9 is a simulation result of an SOC at the time of actual driving or after actual driving obtained using the battery model of the modified embodiment.

As illustrated in FIG. 8(*c*), the simulation device 200 simulates the on-road driving test by using the followings: a driving mode model (driver model) that models a driving mode; a vehicle model that models the real vehicle; a PCU model that models a power control unit (PCU) that controls charging and discharging of the real battery in accordance with the vehicle speed and the load; and/or the generated trained model (battery model). By the simulation device 200 simulating various types of actual driving, as illustrated in FIG. 9, it is possible to estimate a change in conditions of the battery such as energy consumption or the SOC at the time of actual driving or after actual driving.

In a case where the vehicle element includes a fuel battery mounted on the vehicle, the response data acquired by the acquisition unit 3 is hydrogen consumption amount data, oxygen consumption amount data, generated current data, generated voltage data, state of charge (SOC) data, and/or battery temperature data. Here, the hydrogen consumption amount data can be measured using a hydrogen meter, and the oxygen consumption amount data can be measured using an oxygen meter. The generated current data or the generated voltage data can be measured using an ammeter or a voltmeter, respectively. The battery temperature data is temperature data of the fuel battery, temperature data of cells (fuel cell) constituting the fuel battery, or temperature data of a stack including a plurality of cells, and can be measured using a thermometer.

Figure 10:
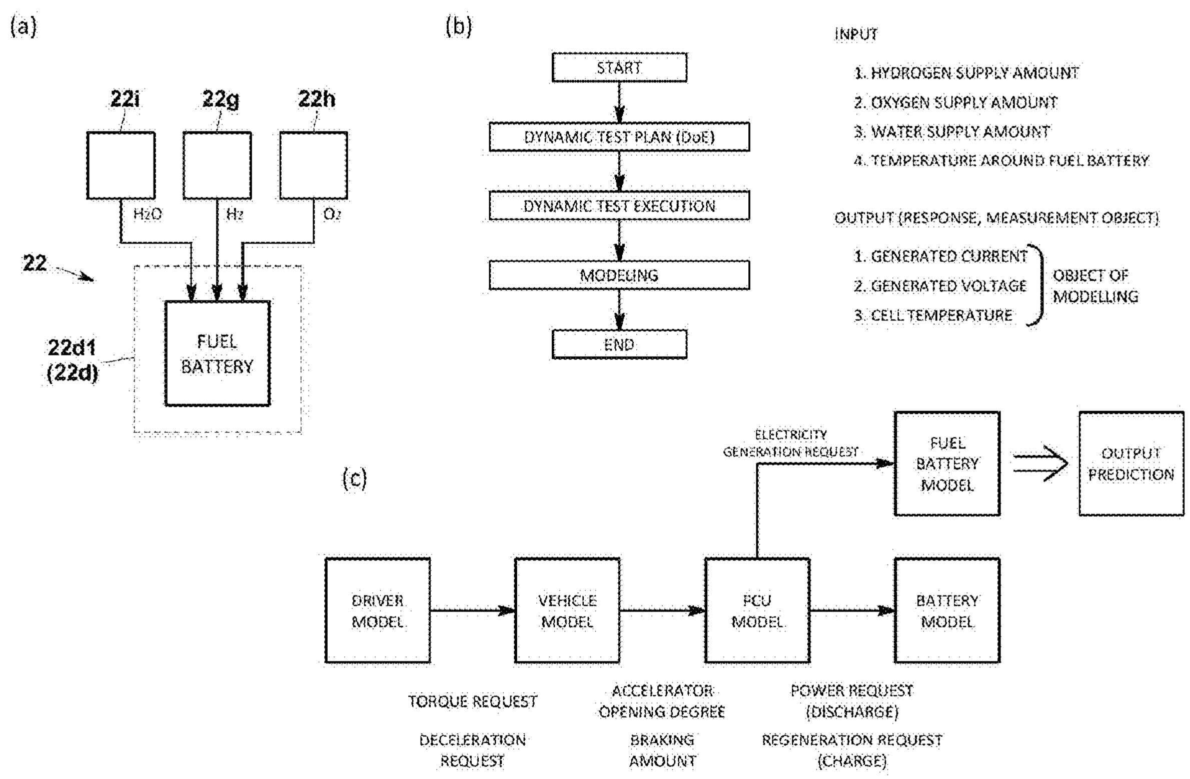
FIG. 10 is schematic diagrams of (a) a diagram illustrating a test system that generates a trained model related to a response of a fuel battery in a modified embodiment, (b) a flowchart of generation of a fuel battery model, and (c) a schematic diagram of a simulation using the fuel battery model.

FIG. 10(*a*) illustrates a test system that generates a trained model related to a response of a fuel battery. FIG. 10(*b*) illustrates a flowchart of generation of a fuel battery model. FIG. 10(*c*) illustrates a schematic diagram of a simulation using the fuel battery model.

As illustrated in FIG. 10(*a*), the test system that generates the fuel battery model includes, as the input equipment 22, for example, a hydrogen supply device 22*g* that supplies hydrogen to the fuel battery accommodated in the test chamber 22*d*1 of the environment variation device 22*d*, an oxygen supply device 22*h* that supplies oxygen (atmosphere), and a water supply device 22*i* that supplies water. Hydrogen, oxygen, and water are respectively supplied to the fuel battery by the hydrogen supply device 22*g*, the oxygen supply device 22*h*, and the water supply device 22*i*, so that the fuel battery model is generated.

Specifically, as illustrated in FIG. 10(*b*), the input data generation unit 21 of the input unit 2 determines a combination of the parameters using the dynamic design of experiments (DoE) ("dynamic test plan"), similarly to the above embodiment. Here, respective ones of parameters are parameters related to a vehicle speed, a load, and a temperature assuming actual road driving, the parameter related to the vehicle speed and the load is, for example, a hydrogen supply amount, the oxygen supply amount, and/or the water supply amount, and the parameter related to the temperature is, for example, a temperature around the fuel battery.

Then, an input including a combination of the determined parameters is given to the fuel battery by the hydrogen supply device 22*g*, the oxygen supply device 22*h*, the water supply device 22*i*, and the environment variation device 22*d*. Here, the training data acquisition unit 32 of the acquisition unit 3 acquires, as training data (learning data set), the input data representing the input given to the fuel battery and the response data of the fuel battery ("dynamic test execution"). Here, as the response data of the fuel battery, it is possible to consider, for example, the generated current data, the generated voltage data, or the cell temperature data.

Next, the generation unit 4 generates the fuel battery model by using the training data obtained by the "dynamic test execution" ("modeling"). The fuel battery model thus obtained is used for simulation of an on-road driving test by the simulation device 200.

As illustrated in FIG. 10(*c*), the simulation device 200 simulates the on-road driving test by using the followings: a driving mode model (driver model) that models a driving mode; a vehicle model that models the real vehicle; a PCU model that models a power control unit (PCU) that controls electricity generation by the fuel battery in accordance with the vehicle speed and the load; and the generated trained model (battery model). FIG. 10(*c*) illustrates an example in which the simulation is performed using the battery model in addition to the fuel battery model, but the battery model does not need to be used.

In a case where the vehicle element includes a motor mounted on the vehicle, the motor rotational speed and the like are input to the motor as the vehicle speed assuming actual road driving.

In addition, in the above embodiment, a combination of four parameters of the vehicle speed, the load, the temperature, and the atmospheric pressure is used as the input to the vehicle element, but a combination of three parameters of the vehicle speed, the load, and the temperature may be used as the input to the vehicle element, or a combination of three parameters of the vehicle speed, the load, and the pressure may be used as the input to the vehicle element. Furthermore, humidity that can be varied by the environment variation device may be added to the parameters and input to the vehicle element.

The plurality of functions provided by the control device 5 of the above embodiment may be shared by a plurality of computers provided physically separately. For example, the input data generation unit 21, the training data acquisition unit 32, and the generation unit 4 may be allocated to a single computer, and other functions may be allocated to another computer.

The on-road driving test conforming to laws and regulations is not limited to the RDE, and may be various on-road driving tests defined by laws or regulations of each country.

In addition, various modifications and combinations of embodiments may be made without being against the gist of the present invention.

INDUSTRIAL APPLICABILITY

With the present invention, it is possible to accurately obtain response data of a vehicle element under a desired driving environment by simulation without performing actual road driving.

REFERENCE SIGNS LIST

100 vehicle element response learning system
E real engine (vehicle element)
22*d* environment variation device
22*d*1 test chamber
31 exhaust gas analyzer
2 input unit
21 input data generation unit
3 acquisition unit
4 generation unit

5 control device (vehicle element response learning device)

The invention claimed is:

1. A vehicle element response learning method for generating a trained model related to a response of a vehicle element that is a vehicle or a part of the vehicle, the method comprising:

an input step of giving an input, including parameters related to a vehicle speed, a load, a temperature and an atmospheric pressure based on actual road driving conditions, to the vehicle element, wherein each of the vehicle speed, the load, the temperature, and the atmospheric pressure are varied over respective ranges resulting in varied parameters, wherein the ranges of the temperature and the atmospheric pressure are divided into a plurality of blocks, and wherein the input further includes a combination of the varied parameters and includes a divided input obtained by varying the temperature and the atmospheric pressure in the blocks;

an acquisition step of acquiring response data of the vehicle element to the input and acquiring, as training data, input data representing the input and the response data, wherein response data of the vehicle element to which the divided input is given is acquired, and wherein divided input data representing the divided input and the response data are acquired as divided training data; and a generation step of generating the trained model related to the response of the vehicle element, from the training data by using machine learning.

2. The vehicle element response learning method according to claim 1, wherein the input includes an input in which the temperature and the atmospheric pressure are varied at a boundary between the blocks.

3. The vehicle element response learning method according to claim 1, further comprising a test chamber in which the vehicle element is accommodated, wherein the temperature and the atmospheric pressure are varied by an environment variation device that varies a temperature and a pressure in the test chamber, or an environment variation device that is connected to the vehicle element and that varies a temperature and a pressure of the vehicle element.

4. The vehicle element response learning method according to claim 1, wherein, in the input step, a combination of the parameters is generated using a design of experiments (DoE).

5. The vehicle element response learning method according to claim 1, wherein the vehicle element is a vehicle, including at least an engine, at least a secondary battery, or at least a fuel battery, or a part of the vehicle, the response data is exhaust gas data, electricity mileage data, current data, voltage data, state of charge (SOC) data, battery temperature data, and hydrogen consumption amount data, oxygen consumption amount data, generated current data, generated voltage data, or battery temperature data.

6. The vehicle element response learning method according to claim 5, wherein the exhaust gas data is measured using an exhaust gas analyzer, the electricity mileage data, the current data, the voltage data, the SOC data, or the battery temperature data is measured using a power consumption meter, an ammeter, a voltmeter, or a thermometer, and the hydrogen consumption amount data, the oxygen consumption amount data, the generated current data, the generated voltage data, or the battery temperature data is measured using a hydrogen meter, an oxygen meter, an ammeter, a voltmeter, or a thermometer.

7. The vehicle element response learning method according to claim 1, wherein the vehicle element is a vehicle, including at least a secondary battery or at least a fuel battery, or a part the vehicle, and wherein the parameter related to the vehicle speed or the load is (i) a charging current and/or a discharging current, and the parameter related to the temperature is an ambient temperature of the secondary battery or (ii) a hydrogen supply amount, an oxygen supply amount, and/or a water supply amount, and the parameter related to the temperature is an ambient temperature of the fuel battery.

8. A vehicle element response calculation method comprising calculating, by using a trained model generated by the vehicle element response learning method according to claim 1, the response data of the vehicle element in actual road driving.

9. A vehicle element response learning system that generates a trained model related to a response of a vehicle element that is a vehicle or a part of the vehicle, the system comprising:

an input unit that gives an input, including parameters related to a vehicle speed, a load, a temperature and an atmospheric pressure based on actual road driving conditions, to the vehicle element, wherein each of the vehicle speed, the load, the temperature, and the atmospheric pressure are varied over respective ranges resulting in varied parameters, wherein the ranges of the temperature and the atmospheric pressure are divided into a plurality of blocks, and wherein the input further includes a combination of the varied parameters and includes a divided input obtained by varying the temperature and the atmospheric pressure in the blocks;

an acquisition unit that acquires response data of the vehicle element to the input and acquires, as training data, input data representing the input and the response data, wherein response data of the vehicle element to which the divided input is given is acquired, and wherein divided input data representing the divided input and the response data are acquired as divided training data; and a generation unit that generates the trained model related to the response of the vehicle element, from the training data by using machine learning.

10. The vehicle element response learning system according to claim 9, wherein the input unit includes:

a dynamometer that applies a load to the vehicle element; and a test chamber in which the vehicle element is accommodated, and the input unit includes:

an environment variation device that varies at least temperature in the test chamber; or an environment variation device that is connected to the vehicle element and varies at least temperature.

11. A non-transitory computer readable medium having instructions stored thereon for a vehicle element response learning program that generates a trained model related to a response of a vehicle element that is a vehicle or a part of the vehicle, the program, when executed by a computer, causing the computer to execute the method of claim 1.

12. A vehicle element response learning method for generating a trained model related to a response of a vehicle element that is a vehicle, including at least a secondary battery or at least a fuel battery, or a part of the vehicle, the method comprising:

an input step of giving an input, including parameters related to a vehicle speed, a load, and a temperature based on actual road driving conditions, to the vehicle element, wherein the parameter related to the vehicle speed or the load is (i) a charging current and/or a discharging current, and the parameter related to the temperature is an ambient temperature of the secondary battery or (ii) a hydrogen supply amount, an oxygen supply amount, and/or a water supply amount, and the parameter related to the temperature is an ambient temperature of the fuel battery;

an acquisition step of acquiring response data of the vehicle element to the input and acquiring, as training data, input data representing the input and the response data; and a generation step of generating the trained model related to the response of the vehicle element, from the training data by using machine learning.

* * * * *